US012540043B2

(12) United States Patent
Hammerquist

(10) Patent No.: US 12,540,043 B2
(45) Date of Patent: Feb. 3, 2026

(54) EJECTION OF ITEMS USING AN INFLATABLE DEVICE WITH ROLLING CONVOLUTIONS

(71) Applicant: Eagle Technology, LLC, Melbourne, FL (US)

(72) Inventor: Robert E. Hammerquist, Huntington, NY (US)

(73) Assignee: Eagle Technology, LLC, Melbourne, FL (US)

( * ) Notice: Subject to any disclaimer, the term of this patent is extended or adjusted under 35 U.S.C. 154(b) by 0 days.

(21) Appl. No.: 18/754,321

(22) Filed: Jun. 26, 2024

(65) Prior Publication Data

US 2026/0001730 A1 Jan. 1, 2026

(51) Int. Cl.
*F41B 11/66* (2013.01)
*B65G 51/02* (2006.01)

(52) U.S. Cl.
CPC .................................... *B65G 51/02* (2013.01)

(58) Field of Classification Search
CPC ........ B65G 51/02; F41B 11/62; F41B 11/642; F41B 11/644; F41B 11/646; F41B 11/66; F41B 11/723; F41B 11/73; F41B 11/80
USPC ........................................ 124/55, 69, 61, 63
See application file for complete search history.

(56) References Cited

U.S. PATENT DOCUMENTS 3,119,302 A * 1/1964 Barr ...................... F16B 31/005 60/632
3,404,598 A * 10/1968 Angelos .................... F42B 3/04 89/1.14
3,738,271 A * 6/1973 La Costa .................. F42B 5/02 102/482
3,967,552 A * 7/1976 Settles ...................... F42B 5/02 102/430
4,406,209 A * 9/1983 Arene ....................... F41A 1/10 89/1.14
4,915,018 A 4/1990 Scott et al.
5,279,199 A 1/1994 August
(Continued)

FOREIGN PATENT DOCUMENTS

EP 0380657 B1 8/1990
JP H05288494 A 11/1993

OTHER PUBLICATIONS

Online Guidebook, "Diaphragm Design Guidebook", www.dia.com, 2018, 28 pages.

*Primary Examiner* — John Cooper
(74) *Attorney, Agent, or Firm* — Edell, Shapiro & Finnan, LLC

(57) ABSTRACT

In an embodiment, an ejection mechanism includes an inflatable device with an inflatable object (e.g., a silicone impregnated or other airbag, etc.) that is folded back inwardly on itself into an interior space of the inflatable object (e.g., forming a convolution, etc.) to envelop an item for ejection from a tube. In order to eject the item, gas enters the inflatable device to facilitate expansion of the inflatable object. The tube structure withstands the pressure loading as does the convolution of the inflatable object. Due to the tube limiting the expansion, the inflatable object rolls against the tube inner surface as it expands to move and/or eject the item from the tube. The inflatable device may further include an inflatable object (e.g., one or more airbags, etc.) in a telescopic arrangement with inflatable telescopic or nested stages (or convolutions) to eject or release the item.

20 Claims, 13 Drawing Sheets

(56) References Cited

U.S. PATENT DOCUMENTS

| | | | | |
|---|---|---|---|---|
| 7,484,450 | B2 * | 2/2009 | Hunn | F41F 3/04 124/61 |
| 8,403,267 | B2 | 3/2013 | Olden | |
| 8,439,301 | B1 | 5/2013 | Lussier et al. | |
| 11,591,050 | B2 * | 2/2023 | Graham | B64U 80/70 |
| 11,662,186 | B2 * | 5/2023 | Cooke | F42B 5/184 102/439 |
| 2018/0304973 | A1 | 10/2018 | Majewski et al. | |

* cited by examiner

EJECTION OF ITEMS USING AN INFLATABLE DEVICE WITH ROLLING CONVOLUTIONS

TECHNICAL FIELD

The present disclosure relates generally to ejection systems and, more specifically, to ejecting or releasing items using an inflatable device with rolling convolutions.

BACKGROUND

Stores or item ejection (e.g. sensors, munitions, logistical payloads, etc.) as actuated from an air or surface vehicle typically involves a piston acted upon by a gas. The gas displaces the piston/payload through a well finished cylinder with a semi-flexible seal maintaining a hermetic seal as the piston slides along the cylinder length to its stroke terminus. This process applies to externally mounted ejection pistons that act laterally upon store or item sides and to items ejected longitudinally from a tube.

However, the piston and cylinder construction requires a fine finish, and a high degree of roundness and parallelism to maintain a smooth-running action between the piston and cylinder, and to maintain the required hermetic seal at the piston/cylinder interface. Often, these seals create a significant amount of drag (diminishing the ejection force), have some degree of leakage, and are costly and time consuming to engineer and manufacture. For tube ejection, additional payload features that may require a non-round tube cross-section or gaps or ports to accommodate projections (e.g., fins, wings, or connector housings, etc.) are not compatible with this traditional actuation. In order to attain a long ejection stroke, additional complications, such as telescopic pistons, provide technical challenges and increase the cost significantly.

BRIEF DESCRIPTION OF THE DRAWINGS

Generally, like reference numerals in the various figures are utilized to designate like components.

DETAILED DESCRIPTION

Overview

Figure 1A:
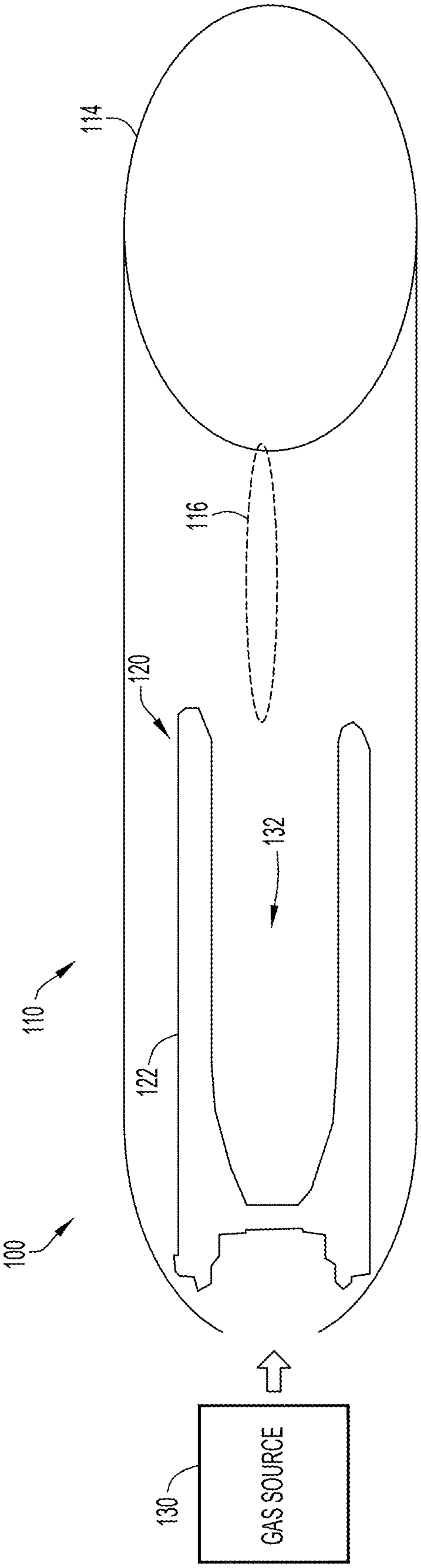
FIG. 1A is a view in elevation of an ejection mechanism employing an inflatable device according to an embodiment of the present disclosure.

In an embodiment, an ejection mechanism includes an inflatable device with an inflatable object (e.g., a silicone impregnated or other airbag, etc.) that is folded back inwardly on itself into an interior space of the inflatable object (e.g., forming a convolution, etc.) to envelop a forebody of an item for ejection of the item from a tube. In order to eject the item from the tube, gas enters the inflatable device to facilitate expansion of the inflatable object. The tube structure withstands the pressure loading as does the convolution of the inflatable object. Due to the tube limiting the expansion, the inflatable object rolls against the tube inner surface as it expands to move and/or eject the item from the tube. The inflatable device may further include an inflatable object (e.g., one or more airbags, etc.) in a telescopic arrangement with inflatable telescopic or nested stages (or convolutions) to eject or release the item.

Example Embodiments

In an embodiment, an ejection mechanism includes an inflatable device with an inflatable object (e.g., a silicone impregnated or other airbag, etc.) that is folded back inwardly on itself into an interior space of the inflatable object (e.g., forming a convolution, etc.) to envelop a forebody of an item for ejection of the item from a tube. In order to eject the item from the tube, gas enters the inflatable device to facilitate expansion of the inflatable object. The tube structure withstands the pressure loading as does the convolution of the inflatable object. Due to the tube limiting the expansion, the inflatable object rolls against the tube inner surface as it expands to move and/or eject the item from the tube. The inflatable device may further include an inflatable object (e.g., one or more airbags, etc.) in a telescopic arrangement with inflatable telescopic or nested stages (or convolutions) to eject or release the item.

Present embodiments may provide several advantages. For example, sliding friction is eliminated, no piston (or fluid) seals are required, and the tube may have moderate gaps or slits and be non-circular in cross-section (to which the inflatable device conforms as it rolls). The gaps or slits enable an embodiment to accommodate items with various projections. By way of example, the tube can be perforated or slotted (e.g., for wings, fins, connector access, etc.), where the inflatable device can traverse modest gaps or slots in the tube without leaking.

Further, the tube may be made from disposable or recyclable low-cost materials (e.g., cardboard, etc.). This is advantageous since empty canisters are typically not recycled. An embodiment provides low investment since there is no need for high cost tooled surfaces and non-recurring engineering (NRE) costs. An embodiment is scalable and configurable for various cross-sectional shapes (e.g., non-round, oval, ellipsoid, etc.). Moreover, the bag/item contact surface is large, thereby eliminating item point loading. An embodiment may be of low weight, low part count, high reliability, and employ disposable tubes. The inflatable device of an embodiment may leverage low-cost and high volume and quality vehicle airbag textiles. An embodiment can be used in hot (e.g., pyrotechnic, etc.) or cold gas (e.g., nitrogen, air, helium, etc.) applications. In addition, embodiments can employ a single convolution or multiple convolutions in a telescopic arrangement (e.g., telescopic convolutions, etc.) for short or highly featured items and/or extremely long strokes.

The ejection mechanism of present embodiments may be used by any stationary or mobile platform in substantially the same manner described below. As used herein and in the claims, the term "mobile platform" encompasses any platform capable of translational and/or rotational movement, including terrestrial vehicles (e.g., manned vehicles, unmanned ground rovers, etc.) and other terrestrial portable or temporary mounting platforms, airborne and spaceborne platforms (e.g., fixed-wing manned and unmanned aircraft, balloons, satellites, and small unmanned aerial vehicles (sUAV), such as a small, quad-copter drone), and seaborne platforms (e.g., ships, buoys, surface-located submarines, underwater sub-surface autonomous vehicles, etc.).

Figure 1B:
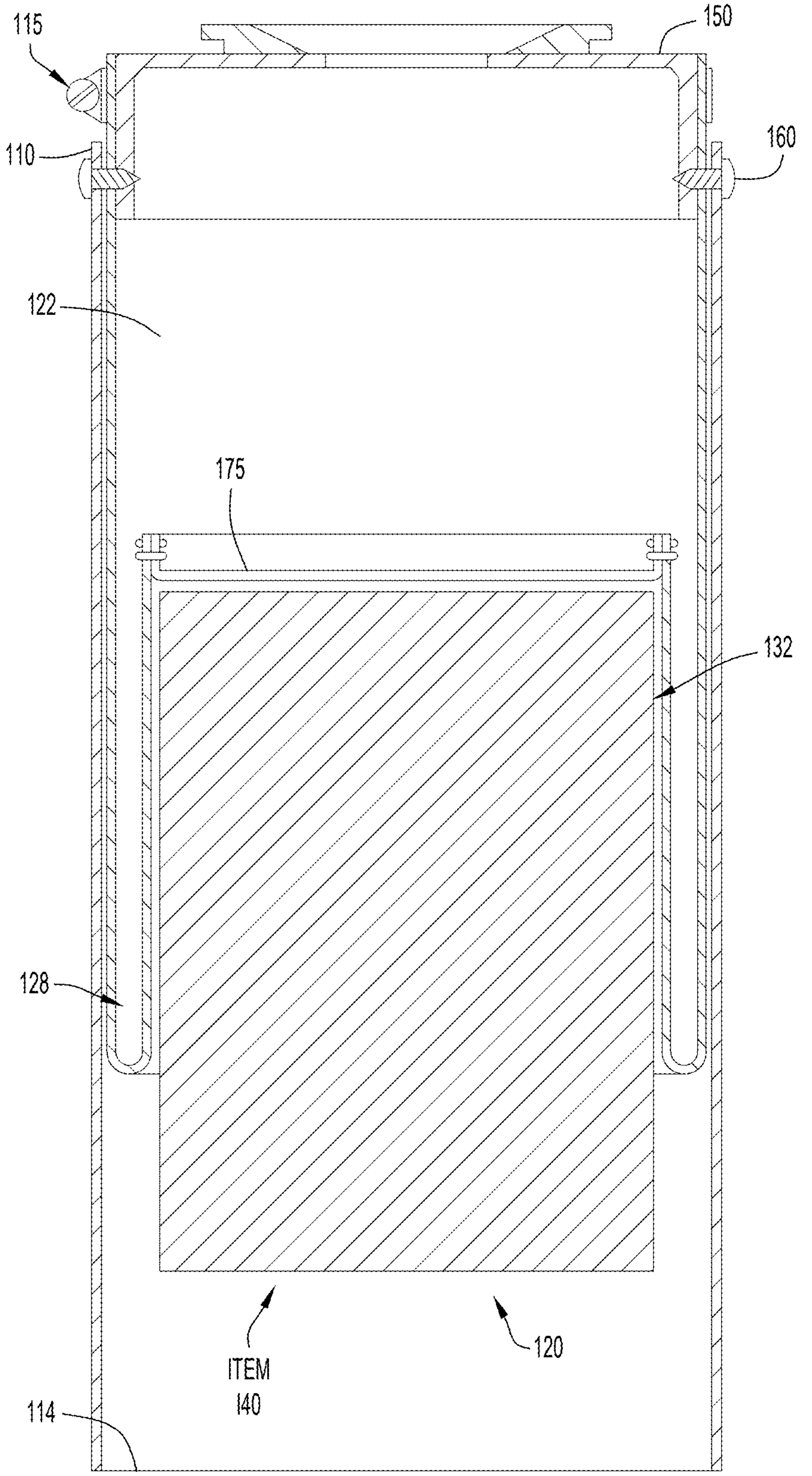
FIG. 1B is a view in elevation and partial section of the inflatable device of FIG. 1A according to an embodiment of the present disclosure.

An ejection mechanism according to an embodiment of the present disclosure is illustrated in FIGS. 1A-1B. Specifically, an ejection mechanism 100 includes a tubular member or other retaining structure 110 and an inflatable device 120 disposed within tubular member 110 toward a tubular member proximal end. The tubular member may be implemented by any type of structure with a hollow or partially hollow interior to receive one or more items (e.g., tube, pipe, cylinder, etc.). Tubular member 110 typically contains one or more items 140 (FIG. 1B) that inflatable device 120 ejects from the tubular member interior. Items 140 may include any quantity of any items suitable for delivery (e.g., sensors, munitions, logistical payloads, food, clothing, etc.). Tubular member 110 includes an opening or aperture 114 disposed at a tubular member distal end. The tubular member has an open (or partially open) proximal end that is coupled to (or engages) a gas or other fluid source 130 that supplies fluid to expand inflatable device 120 as described below. The gas or fluid source may be any conventional or other source of fluid (e.g., gas, liquid, etc.), and may be a separate component or included within the ejection mechanism.

Tubular member 110 may include one or more slots or openings 116 defined therein that accommodate or receive projections (e.g., fins, wings, etc.) of, and/or enable access to (e.g., connectors, etc.), one or more items contained within the tubular member interior. The slots may be disposed at any locations on tubular member 110, and may extend longitudinally along the tubular member to enable projections of corresponding items 140 to traverse the tubular member during ejection of those items. The slots or openings may be of any quantity, may be disposed at any locations on the tubular member, may include any shape (e.g., circular, elliptical, rectangular, etc.), and may have any suitable dimensions (e.g., length, width, etc.). The tubular member may include any cross-sectional shape (e.g., circular, non-circular, elliptical, rectangular, etc.), and may have any suitable dimensions (e.g., length, width, height, volume, etc.) for containing one or more items. The tubular member may be made of any suitable materials, but preferably disposable or recyclable materials (e.g., cardboard, etc.). Tubular member 110 has sufficient strength to withstand expansion of inflatable device 120 for ejection of items from the tubular member as described below.

Referring to FIG. 1B, inflatable device 120 may include any device or object (e.g., bag, balloon, etc.) that inflates or expands. By way of example, inflatable device 120 includes an airbag 122. The airbag may be constructed of any suitable materials, such as those used for conventional airbags for automobiles or other vehicles. The airbag is generally cylindrical, but may be of any shape. Airbag 122 includes a proximal end secured to a fluid fitting cap 150 via a hose clamp 115. The airbag proximal end is secured between tubular member 110 and fluid fitting cap 150 via fasteners 160 (e.g., screws, etc.). Fluid fitting cap 150 engages gas source 130 to enable gas or other fluid to enter and expand airbag 122.

A distal end of airbag 122 includes a cap or plug 175. The cap may be of any suitable size or shape and constructed of any desired materials. The cap may be sewn to the airbag distal end, preferably with a seam on the external side and double row stitching. Airbag 122 is constructed with a fold 128 enabling a portion of the airbag to fold back inwardly over itself into an interior space of the airbag, thereby disposing cap 175 within tubular member 110 toward the airbag proximal end and forming a recess or convolution 132 extending within the airbag interior (e.g., extends approximately 40% or more of the length of the airbag, etc.). For example, slightly less than one-half of the airbag is folded back inwardly over itself to form recess or convolution 132, but any portion less than 50% of the airbag may be folded back inwardly over itself to form the convolution (e.g., at least 40%, etc.). Convolution 132 receives and envelops a portion of an item 140 in tubular member 110 to eject the item from the tubular member in response to expansion of airbag 122.

Airbag 122 receives fluid from gas source 130 and inflates or expands within tubular member 110 toward aperture 114, thereby moving item 140 toward and through aperture 114 of the tubular member. The inner surfaces of tubular member 110 withstand the pressure of the airbag expansion, and basically direct expansion of the airbag longitudinally along the tubular member. The expansion causes the airbag to unfold over itself and roll along the tubular member interior surface, thereby causing cap 175 to move away from the tubular member proximal end beyond fold 128 and toward aperture 114. Cap 175 engages and applies force to move item 140 toward and through aperture 114 in response to the expansion of airbag 122 to eject the item from tubular member 110.

Tubular member 110 may include slots or openings for projections of item 140 (e.g., fins, wings, etc.) and/or connectors to access the item. Airbag 122 traverses these slots or openings during expansion within the tubular member to eject the item. In addition, the projections of item 140 are disposed within and traverse the slots of tubular member 110 during expansion to enable the ejection mechanism to accommodate these types of items.

Figures 2A, 2B, 2C:
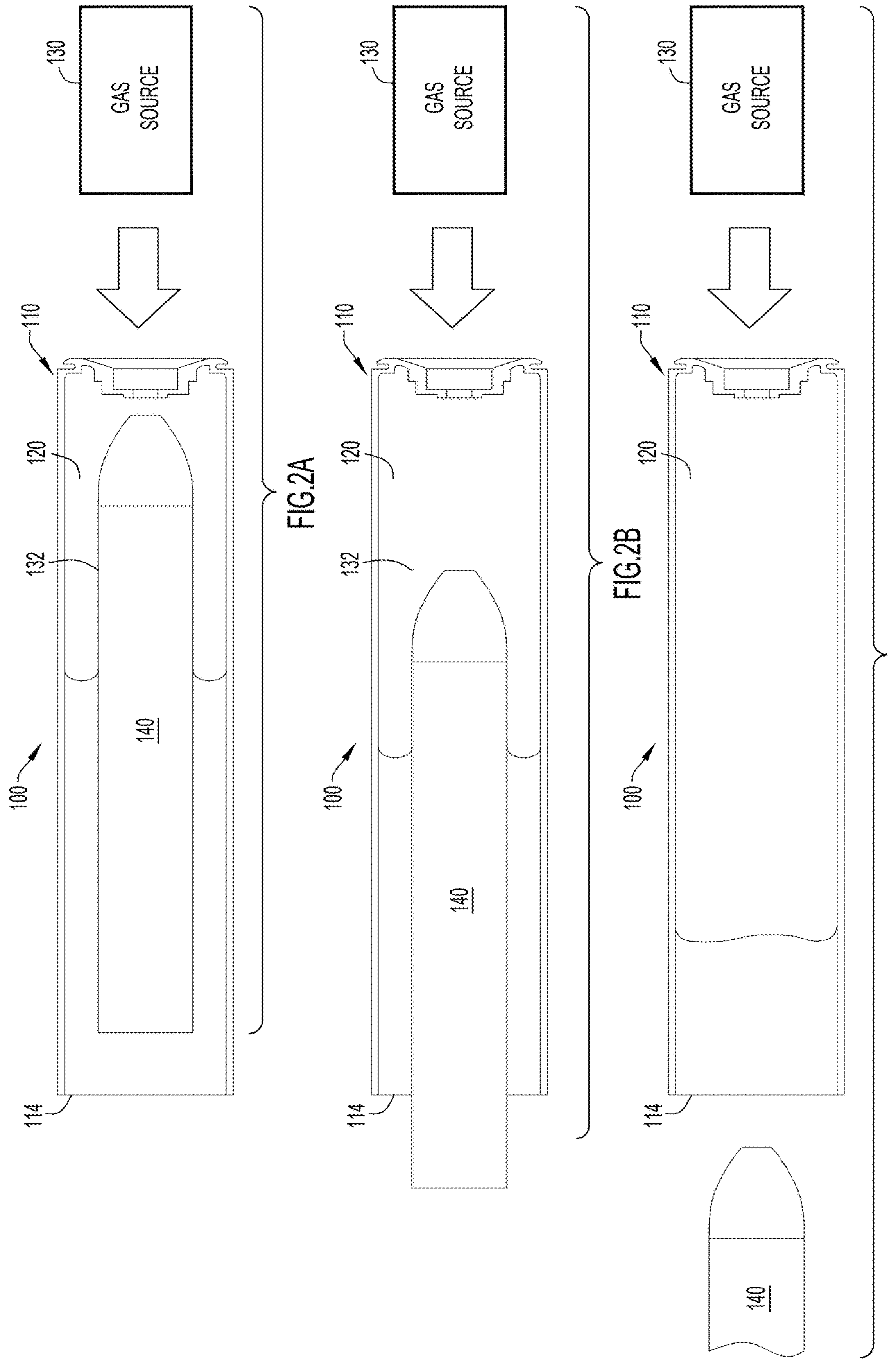
FIG. 2A is a view in elevation and partial section of an item disposed within an ejection mechanism and engaging an inflatable device according to an embodiment of the present disclosure.
FIG. 2B is a view in elevation and partial section of the ejection mechanism of FIG. 2A with the inflatable device expanding to eject the item according to an embodiment of the present disclosure.
FIG. 2C is a view in elevation and partial section of the ejection mechanism of FIG. 2A with the inflatable device in an expanded state and the item ejected according to an embodiment of the present disclosure.

Referring to FIGS. 2A-2C, tubular member 110 of ejection mechanism 100 includes inflatable device 120 partially folded over itself to form a recess or convolution 132 in substantially the same manner described above. An item 140 may be disposed within tubular member 110 such that a distal portion of the item is placed within recess or convolution 132 (FIG. 2A) with inflatable device 120 in a compressed or contracted state. By way of example, item 140 may include a frusto-conical distal portion placed within recess or convolution 132.

Fluid from gas source 130 is applied to inflatable device 120 (FIG. 2B) that causes the inflatable device to inflate or expand within tubular member 110. The inner surfaces of tubular member 110 withstand the pressure of the inflatable device expansion, and basically direct expansion of the inflatable device longitudinally along the tubular member. The expansion causes the inflatable device to unfold over itself and roll along the tubular member interior surface, thereby applying force to move item 140 toward aperture 114. As inflatable device 120 continues to expand to full length within tubular member 110, the inflatable device applies force to move item 140 toward and through aperture 114 (FIG. 2C) to eject the item from the tubular member.

Tubular member 110 may include slots or openings for projections of item 140 (e.g., fins, wings, etc.) and/or connectors to access the item. Airbag 122 traverses these slots or openings during expansion within the tubular member to eject the item. In addition, the projections of item 140 are disposed within and traverse the slots of tubular member 110 during expansion to enable the ejection mechanism to accommodate these types of items.

Items may contain prominent end features that the inflatable device or airbag cannot overlap. Further, the length of the tubular member may need to be reduced for certain applications. Accordingly, an embodiment of the present disclosure provides an ejection mechanism with a telescopic inflatable device (including plural inflatable telescopic stages or convolutions) that may accommodate the prominent end features of items and reduce the length of the tubular member (that does not contribute to stroke). For example, an inflatable device with a single stage or convolution may be used with a tubular member having a length greater than the length of an expanded inflatable device. The additional length of the tubular member beyond the inflatable device may not be needed for stroke. In this case, the compressed inflatable device may encompass one-half of the length of the tubular member. However, the telescopic inflatable device may be used with a tubular member without the additional length, and encompass one-fourth of the length of the tubular member as described below.

Figure 3A:
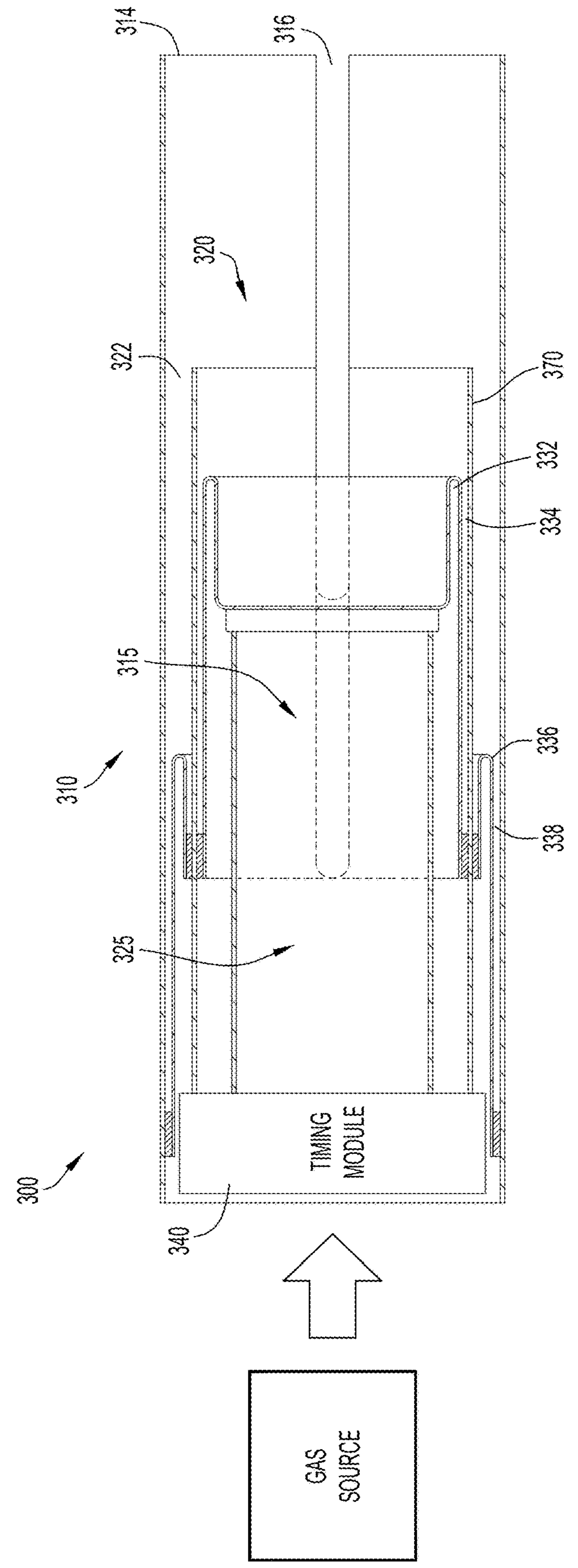
FIG. 3A is a view in elevation and partial section of an ejection mechanism with a telescopic inflatable device for ejecting an item according to an embodiment of the present disclosure.
Figure 3B:
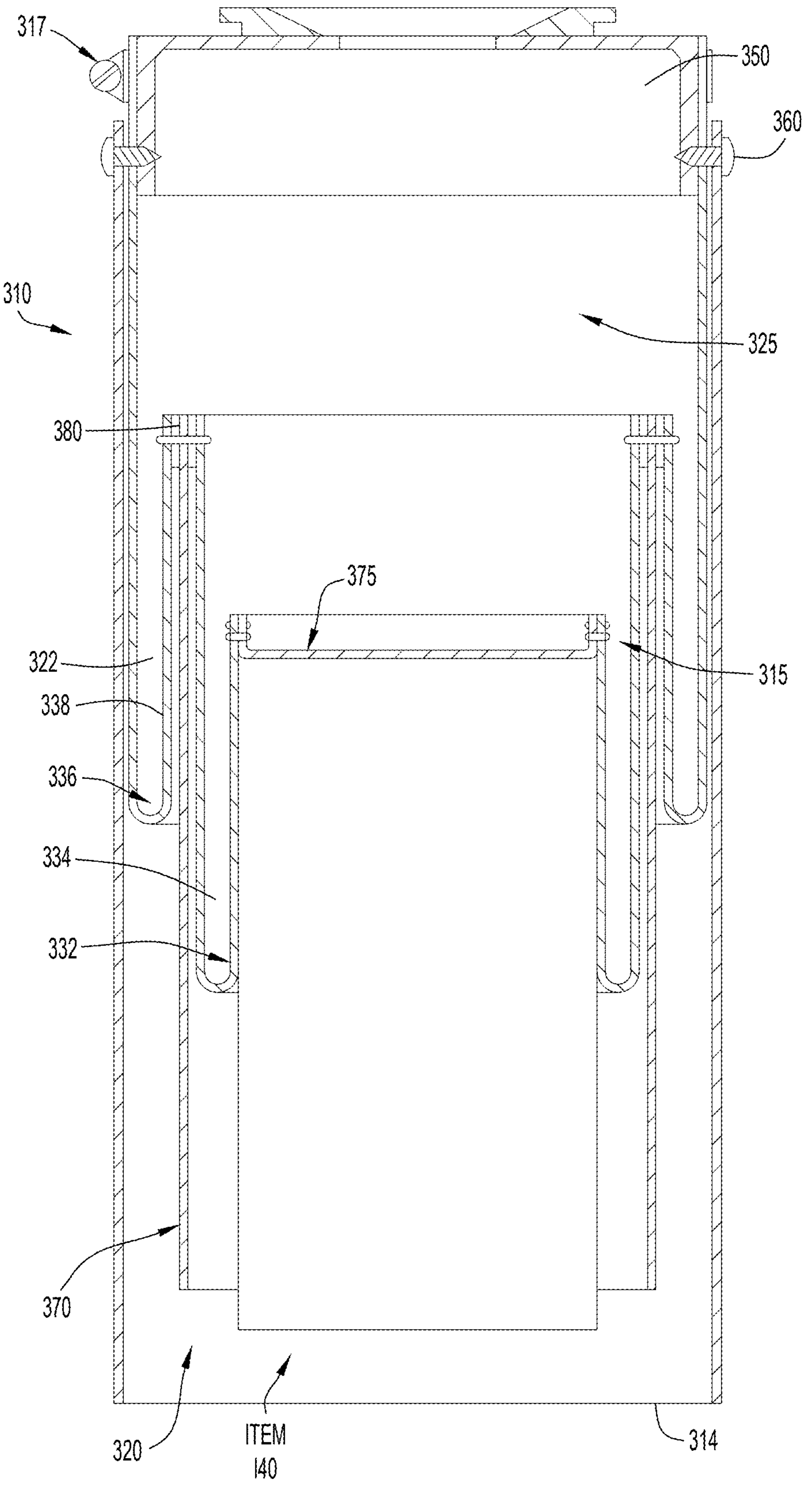
FIG. 3B is a view in elevation and partial section of the telescopic inflatable device of FIG. 3A for ejecting an item according to an embodiment of the present disclosure.

An ejection mechanism with a telescopic inflatable device for ejecting an item according to an embodiment of the present disclosure is illustrated in FIGS. 3A-3B. Specifically, an ejection mechanism 300 includes a tubular member or other retaining structure 310, an inflatable device 320 disposed within tubular member 310 toward a tubular member proximal end, and a timing module or mechanism 340 coupled to the inflatable device. The tubular member may be implemented by any type of structure with a hollow or partially hollow interior (e.g., tube, pipe, cylinder, etc.) to receive one or more items. Tubular member 310 typically contains items 140 (FIG. 3B) that inflatable device 320 ejects from the tubular member interior. Tubular member 310 includes an opening or aperture 314 disposed at a tubular member distal end. The tubular member has an open (or partially open) proximal end that is coupled to (or engages) gas or other fluid source 130 that supplies fluid to expand inflatable device 320 as described below. The gas or fluid source is substantially similar to the gas or fluid source described above, and may be a separate component or included within ejection mechanism 300.

Tubular member 310 may include one or more slots or openings 316 defined therein that accommodate or receive projections (e.g., fins, wings, etc.) of, and/or enable access to (e.g., connectors, etc.), one or more items contained within the tubular member interior. The slots may be disposed at any locations on tubular member 310, and may extend longitudinally along the tubular member to enable projections of corresponding items 140 to traverse the tubular member during ejection of those items. The slots or openings may be of any quantity, may be disposed at any locations on the tubular member, may include any shape (e.g., circular, elliptical, rectangular, etc.), and may have any suitable dimensions (e.g., length, width, etc.). The tubular member may include any cross-sectional shape (e.g., circular, non-circular, elliptical, rectangular, etc.), and may have any suitable dimensions (e.g., length, width, height, volume, etc.) for containing one or more items. The tubular member may be made of any suitable materials, but preferably disposable or recyclable materials (e.g., cardboard, etc.). Tubular member 310 has sufficient strength to withstand expansion of inflatable device 320 for ejection of items from the tubular member as described below.

Referring to FIG. 3B, inflatable device 320 may include any device or object (e.g., bag, balloon, etc.) that inflates or expands. By way of example, inflatable device 320 includes an airbag 322. The airbag may be constructed of any suitable materials, such as those used for conventional airbags for automobiles or other vehicles. The airbag is generally cylindrical, but may be of any shape. Airbag 322 includes a proximal end secured to a fluid fitting cap 350 via a hose clamp 317. The airbag proximal end is secured between tubular member 310 and fluid fitting cap 350 via fasteners 360 (e.g., screws, etc.). Fluid fitting cap 350 engages gas source 130 to enable gas or other fluid to enter and expand airbag 322.

A distal end of airbag 322 includes a cap or plug 375. The cap may be of any suitable size or shape and constructed of any desired materials. The cap may be sewn to the airbag distal end, preferably with a seam on the external side and double row stitching. Airbag 322 includes telescoping stages 315, 325 with stage 315 disposed distally of stage 325. Airbag 322 is constructed with a fold 336 enabling a portion of the airbag to fold back inwardly over itself into an interior space of the airbag, thereby forming an outer recess or convolution 338 within the interior of stage 325 (e.g., extends approximately 40% or more of the length of stage 325, etc.). For example, slightly less than one-half of stage 325 of airbag 322 is folded back inwardly over itself to form outer recess or convolution 338, but any portion less than 50% of stage 325 may be folded back inwardly over itself to form the convolution (e.g., at least 40%, etc.).

Airbag 322 is further constructed with a fold 332 enabling a portion of the airbag to fold back inwardly over itself into an interior space of the airbag, thereby forming an inner recess or convolution 334 extending within the interior of stage 315 (e.g., extends approximately 40% or more of the length of stage 315, etc.). For example, slightly less than one-half of stage 315 of airbag 322 is folded back inwardly over itself to form inner recess or convolution 334, but any portion less than 50% of stage 315 may be folded back over itself to form the convolution (e.g., at least 40%, etc.). Cap 375 of the distal end of airbag 322 forms the bottom of inner convolution 334, and receives and envelops a portion of item 140 in tubular member 310. Stage 315 further includes a stage tubular member 370 containing stage 315 and inner convolution 334. The stage tubular member extends from the bottom of outer convolution 338 toward aperture 314, and has a length typically similar to the length of expanded stage 315. The bottom portions of outer convolution 338, stage 315, and stage tubular member 370 are secured together by fasteners 380 (e.g., rivets, etc.) with the stage tubular member disposed between the outer convolution and stage 315. The stage tubular member may include any cross-sectional shape (e.g., circular, non-circular, elliptical, rectangular, etc.), and may have any suitable dimensions (e.g., length, width, height, volume, etc.) for containing stage 315 and the inner convolution. The stage tubular member may be made of any suitable materials, but preferably disposable or recyclable materials (e.g., cardboard, etc.).

Outer convolution 338 of stage 325 has dimensions greater than the dimensions of inner convolution 334 of stage 315. Outer convolution 338 of stage 325 receives inner convolution 334 of stage 315 to eject item 140 from tubular member 310 in response to expansion of airbag 322. Outer convolution 338 has at least a partially open bottom portion to enable fluid to pass therethrough to inflate or expand inner convolution 334. In other words, stages 315, 325 are nested (or form a telescopic arrangement) such that each stage expands simultaneously with stage 315 engaging and applying force to move item 140 toward aperture 314 to eject the item from tubular member 310. Timing module 340 controls the rate of expansion of each stage 315, 325 to enable the stages to expand simultaneously and reach full expansion at substantially the same time.

Airbag 322 receives fluid from gas or fluid source 130 and stages 315, 325 simultaneously inflate or expand within tubular member 310 toward aperture 314, thereby moving item 140 toward and through aperture 314 of the tubular member. The gas or fluid source may be any conventional or other source of fluid (e.g., gas, liquid, etc.), and may be a separate component or included within ejection mechanism 300. The inner surfaces of tubular member 310 withstand the pressure and guide expansion of stage 325 (or outer convolution 338), while the inner surfaces of stage tubular member 370 withstand the pressure and guide expansion of stage 315 (or inner convolution 334). Tubular member 310 and stage tubular member 370 basically direct expansion of corresponding stages 325, 315 longitudinally along tubular member 310. The expansion causes outer convolution 338 of stage 325 to unfold over itself and roll along the tubular member interior surface, and inner convolution 334 of stage 315 to unfold over itself and roll along the stage tubular member interior surface. This causes the bottom of outer convolution 338 and the bottom of inner convolution 334 to move toward aperture 314. Timing module 340 controls the rate of expansion of each stage to enable the stages (or outer and inner convolutions) to expand simultaneously and reach full expansion at substantially the same time. Cap 375 of inner convolution 334 engages and applies force to move item 140 toward and through aperture 314 in response to the expansion of the stages to eject the item from tubular member 310.

Tubular member 310 may include slots or openings for projections of item 140 (e.g., fins, wings, etc.) and/or connectors to access the item. Airbag 322 traverses these slots or openings during expansion within the tubular member to eject the item. In addition, the projections of item 140 are disposed within and traverse the slots of tubular member 310 during expansion to enable ejection mechanism 300 to accommodate these types of items.

Figure 4A:
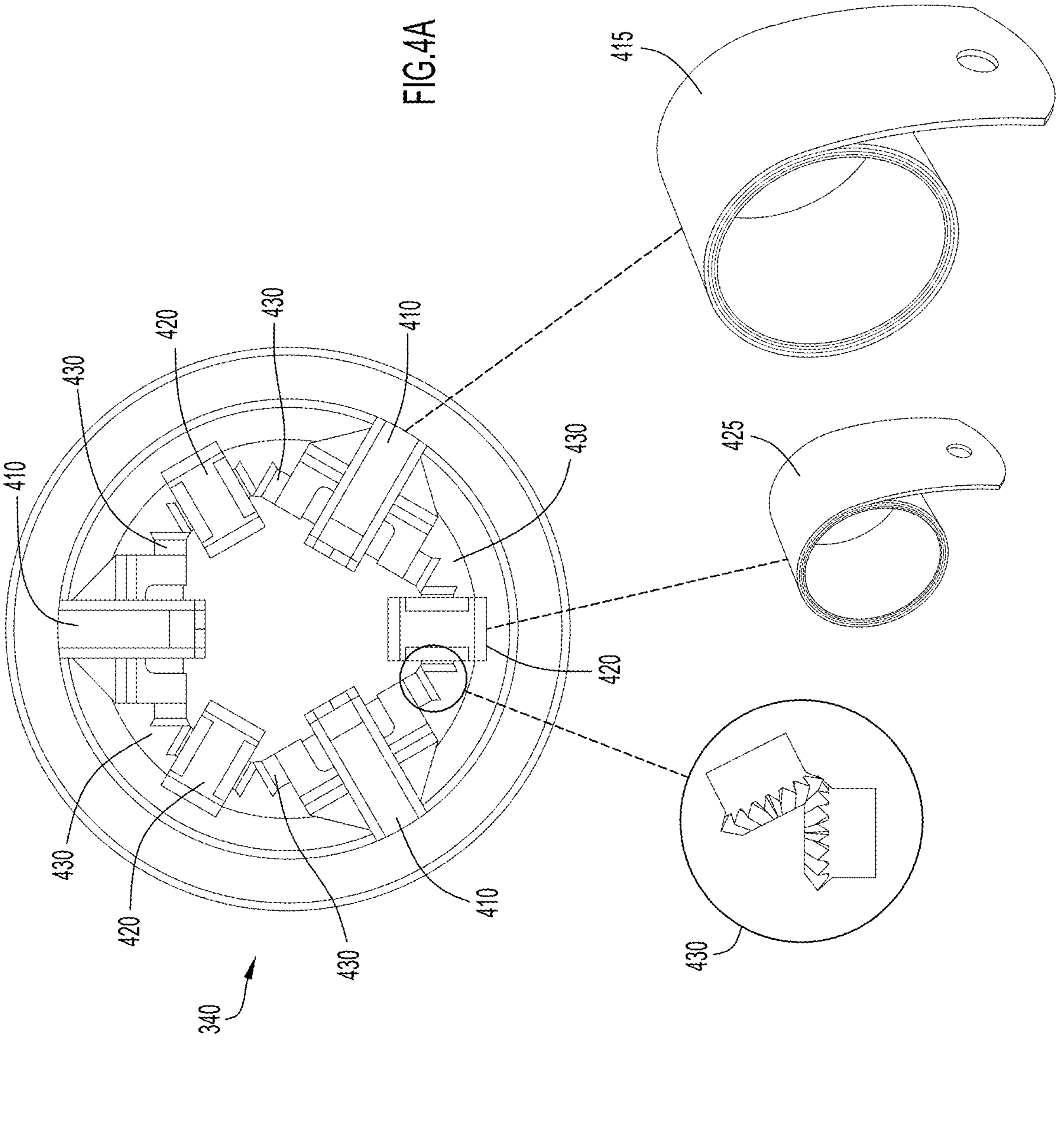
FIG. 4A is a view in plan of a timing module of the ejection mechanism of FIG. 3A according to an embodiment of the present disclosure.
Figure 4B:
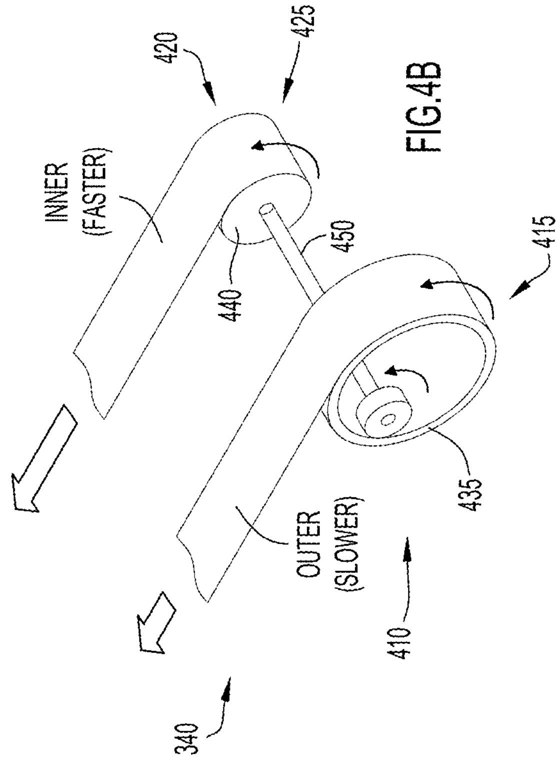
FIG. 4B is a view in perspective of the timing module of the ejection mechanism of FIG. 4A controlling expansion of the telescopic inflatable device according to an embodiment of the present disclosure.
Figure 4C:
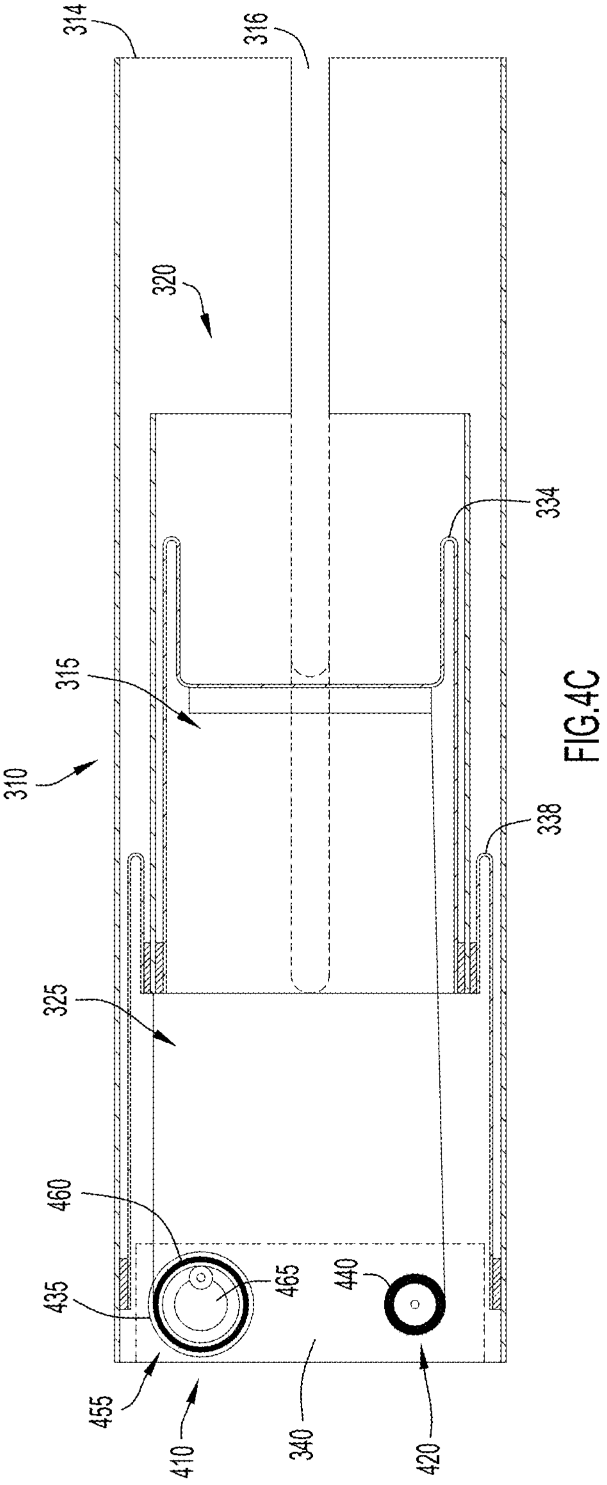
FIG. 4C is a view in elevation and partial section of the ejection mechanism of FIG. 4A with the timing module coupled to the inflatable device according to an embodiment of the present disclosure.

Timing module 340 controls the rate of expansion of inner convolution 334 and outer convolution 338, preferably at a two to one (2:1) ratio. In other words, inner convolution 334 expands at twice the rate of expansion of outer convolution 338. This enables the stages (or convolutions) to reach a fully expanded state at substantially the same time and avoids jamming during the expansion. However, the rate of expansion may be at any suitable or desired ratios depending on airbag and/or convolution characteristics. Constant force strip springs may be employed to retract the stages to return the ejection mechanism to an initial position after ejection of an item. Referring to FIGS. 4A-4C, timing module 340 (FIG. 4A) includes expansion control devices 410, 420 and gearing units 430. Expansion control devices 410 control the rate of expansion of stage 325 (e.g., the rate at which outer convolution 338 unfolds or rolls), while expansion control devices 420 control the rate of expansion of stage 315 (e.g., the rate at which inner convolution 334 unfolds or rolls). Expansion control devices 410 provide greater force (or resistance) relative to expansion control devices 420, thereby enabling stage 315 to expand at a faster rate relative to stage 325.

By way of example, timing module 340 includes three expansion control devices 410, three expansion control devices 420, and three gearing units 430 forming a triad configuration. A gearing unit 430 is disposed between each pair of expansion control devices 410, 420. The gearing unit may be implemented by any conventional or other gears or gearing mechanisms (e.g., 120 degree bevel gearing, etc.). However, any quantity of expansion control devices and gearing units may be employed. The timed triad configuration enables each stage 315, 325 to be tied to timing module 340 at three points without any induced tipping moment of displacing elements.

Expansion control devices 410, 420 may include any conventional or other devices (e.g., constant force strip springs, etc.) to control the rate of expansion of stages 315, 325. By way of example, expansion control devices 410, 420 may be implemented by constant force strip springs 415, 425 (FIG. 4B). Constant force strip springs are basically coiled flat steel bands that linearly reel in/out from a rolled state. In an embodiment, constant force strip springs of the same thickness but differing in diameter at an approximate five to eight (5:8) ratio may be employed. Each spring 415, 425 is wound on a proportionality sized corresponding mandrel/drum 435, 440 with the inner spring end fixed to the corresponding drum tangentially. Each drum 435, 440 can rotate about shafts 450 mounted to a grounded structure at the proximal end of tubular member 310 (FIG. 4C). The unsecured end of spring 415 of expansion control device 410 is attached to outer convolution 338 (providing a slower rate of expansion), while the unsecured end of spring 425 of expansion control device 420 is attached to inner convolution 334 (providing a faster rate of expansion). Drums 435, 440 rotate and reel out under constant force (e.g., two pound or other pullback or resistance, etc.) as outer and inner convolutions 338, 334 expand during ejection of items.

A triad of pairs of springs 415/drums 435 are interconnected with pairs of springs 425/drums 440 via a one to one (1:1) ratio gearing unit 430 (e.g., 120 degree bevel gears, etc.) as described above. The drum pairs 435, 440 are timed relative to one another by a gear system 455 disposed within drum 435 (FIG. 4C). This includes an internal spur gear 460 engaged with a rim of drum 435 and meshing with a pinion gear 465 that is connected to a center of drum 440 at an approximate five to sixteen (5:16) ratio. Accordingly, the ratio of the rate of expansion between springs 425, 415 may be determined from the diameter and gear ratios (e.g., ⅝ diameter ratio*16/5 gear ratio=2), thereby providing different controlled rates of expansion between the inner and outer convolutions 334, 338 (e.g., the inner convolution (spring 425) expands at twice the rate of the outer convolution (spring 415)), each displacing under the influence of expanding gas or fluid during ejection of items.

Timing module 340 maintains a two to one (2:1) feed ratio between springs 425 and springs 415. However, the feed ratio may be any desirable feed ratio depending on the number of stages used and/or displaced length difference. The internal spur gear offsets the centers of springs 415, 425 about an equilateral triangle. This, in conjunction with the inherently different drum diameters, places the tangential spring bands 425, 415 at proper radial locations such that they can be attached to the corresponding inner cap or plug 375, and stage tubular member 370, corresponding to stages 315, 325 respectively. A flat band of springs 415, 425 provides a low profile and a wide/strong tension member that is less likely to interfere or damage airbag 322. As gas bleeds off after an ejection, constant force springs 415, 425 retract each element to an initial (pre-ejection) configuration.

Figure 5A:
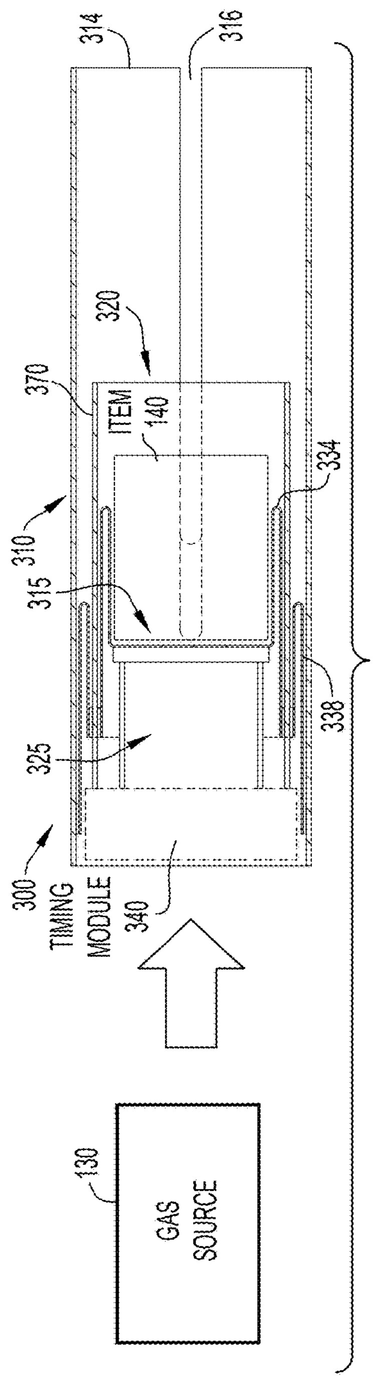
FIG. 5A is a view in elevation and partial section of an ejection mechanism with a telescopic inflatable device in a compressed or uninflated state for ejecting an item according to an embodiment of the present disclosure.
Figure 5B:
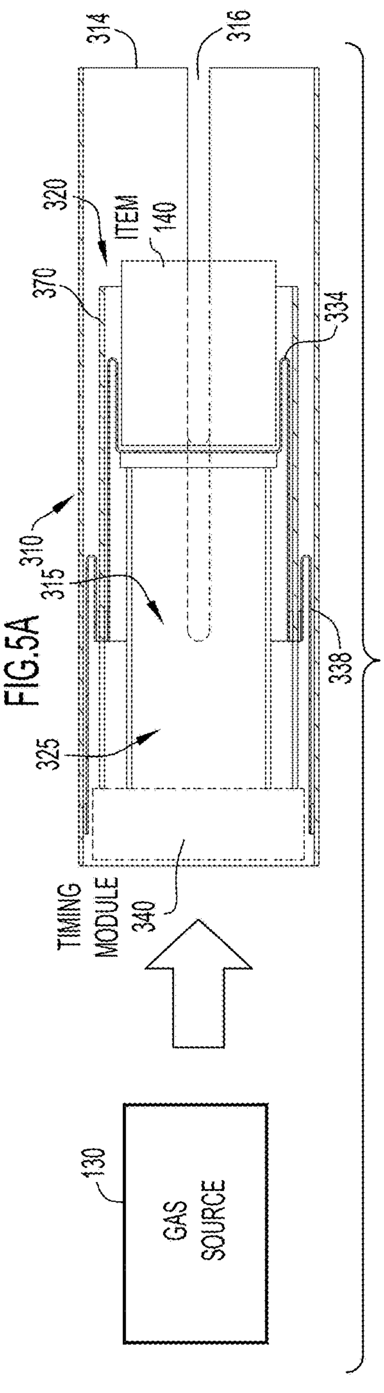
FIG. 5B is a view in elevation and partial section of an ejection mechanism with the telescopic inflatable device partially expanded for ejecting an item according to an embodiment of the present disclosure.
Figure 5C:
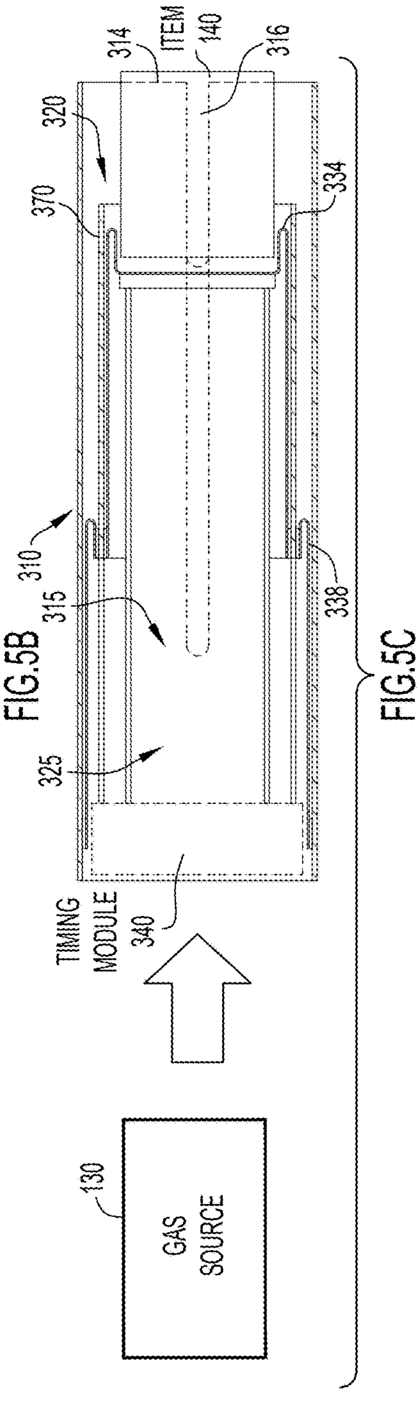
FIG. 5C is a view in elevation and partial section of an ejection mechanism with the telescopic inflatable device having each stage expanded for ejecting an item according to an embodiment of the present disclosure.

Referring to FIGS. 5A-5C, tubular member 310 of ejection mechanism 300 includes inflatable device 320 with stages 315, 325 including inner and outer convolutions 334, 338 as described above. Initially, an item 140 may be disposed within tubular member 310 such that a distal portion of the item is placed within inner convolution 334 (FIG. 5A) with inflatable device 320 in a compressed or contracted state.

Airbag 322 receives fluid from gas source 130 and stages 315, 325 simultaneously inflate or expand within tubular member 310 toward aperture 314 (FIG. 5B), thereby moving item 140 toward aperture 314 of the tubular member. The inner surfaces of tubular member 310 withstand the pressure and guide expansion of stage 325 (or outer convolution 338), while the inner surfaces of stage tubular member 370 withstand the pressure and guide expansion of stage 315 (or inner convolution 334). Tubular member 310 and stage tubular member 370 basically direct expansion of corresponding stages 325, 315 longitudinally along tubular member 310. The expansion causes outer convolution 338 of stage 325 to unfold over itself and roll along the tubular member interior surface, and inner convolution 334 of stage 315 to unfold over itself and roll along the stage tubular member interior surface. This causes the bottom of outer convolution 338 and the bottom of inner convolution 334 to move toward aperture 314.

As inflatable device 320 continues to expand to full length within tubular member 310, the inflatable device applies force to move item 140 toward and through aperture 314 (FIG. 5C) to eject the item from the tubular member. Timing module 340 controls the rate of expansion of each stage to enable the stages (or inner and outer convolutions) to expand simultaneously and reach full expansion at substantially the same time.

Tubular member 310 may include slots or openings 316 for projections of item 140 (e.g., fins, wings, etc.) and/or connectors to access the item. Airbag 322 traverses these slots or openings during expansion within the tubular member to eject the item. In addition, the projections of item 140 are disposed within and traverse the slots of tubular member 310 during expansion to enable ejection mechanism 300 to accommodate these types of items.

Figure 6A:
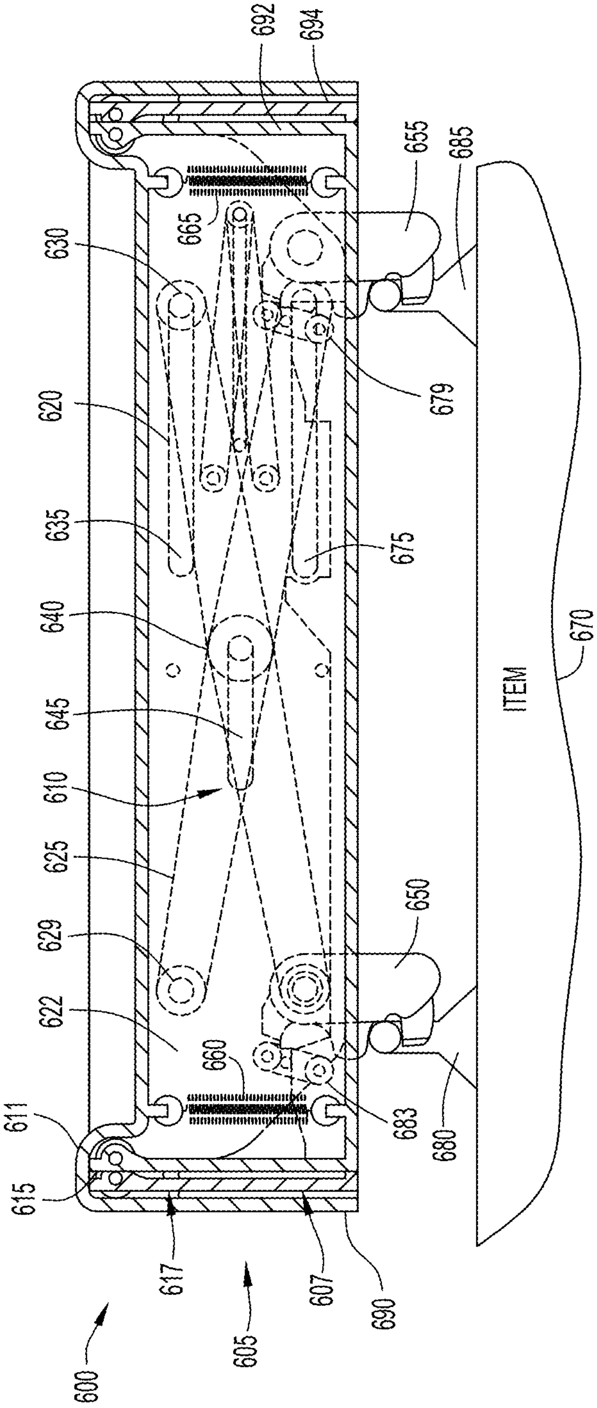
FIG. 6A is a view in elevation and partial section of an ejection mechanism in the form of a release unit with a telescopic inflatable device according to an embodiment of the present disclosure.
Figure 6B:
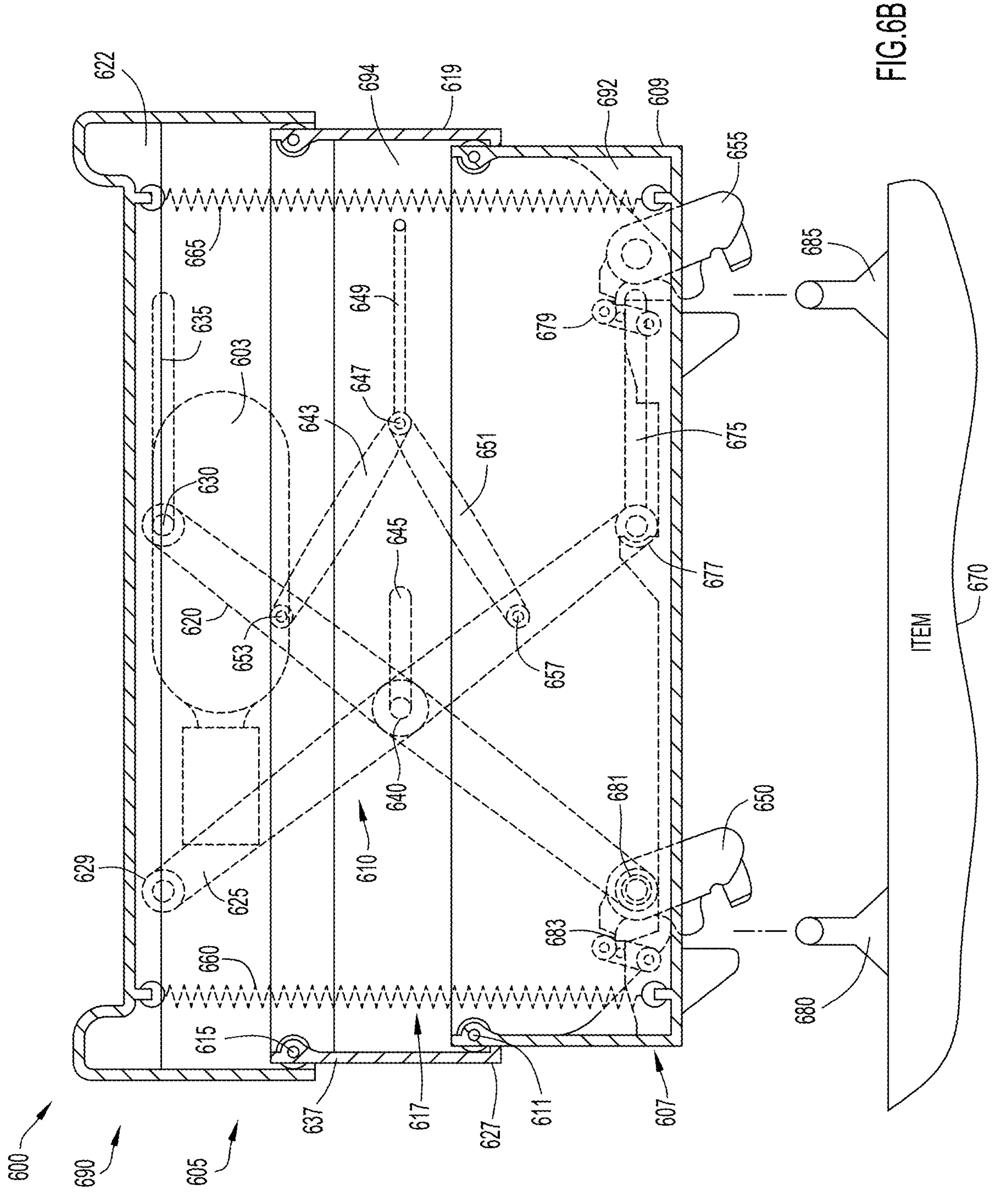
FIG. 6B is a view in elevation and partial section of the ejection mechanism of FIG. 6A with the telescopic inflatable device expanded for releasing an item according to an embodiment of the present disclosure.

An ejection mechanism with a telescopic inflatable device for releasing a secured item according to an embodiment of the present disclosure is illustrated in FIGS. 6A-6B. Initially, the ejection mechanism may be in the form of a release unit 600 that ejects or releases a secured item 670. The item may be secured by a securing mechanism, where the item includes projections or lugs 680, 685 at opposing ends of an item top surface that engage corresponding hooks 650, 655 of the release unit actuated by levers 679, 683 as described below. Release unit 600 includes a housing or other retaining structure 690 with an inflatable device 605 and a telescoping timing mechanism 610 disposed therein. The telescopic timing mechanism controls expansion of the inflatable device as described below. Housing 690 includes an open bottom that enables inflatable device 605 to expand, thereby distancing item 670 from the release unit (and corresponding platform) and disengaging hooks 650, 655 from the item to release the item as described below.

Inflatable device 605 may include any device or object (e.g., bag, balloon, etc.) that inflates or expands. By way of example, inflatable device 605 includes an airbag 622. The airbag may be constructed of any suitable materials, such as those used for conventional airbags for automobiles or other vehicles. The airbag includes telescoping stages 607, 617 with stage 607 disposed distally of stage 617. A proximal end of airbag 622 is secured to a top or upper portion of the housing interior surface. Airbag 622 is constructed with a fold 637 enabling a portion of the airbag to fold back inwardly over itself into an interior space of the airbag, thereby forming an outer recess or convolution 694 extending within the interior of stage 617 (e.g., extends approximately 40% or more of the length of stage 617, etc.). For example, slightly less than one-half of stage 617 of airbag 622 is folded back inwardly over itself to form outer recess or convolution 694, but any portion less than 50% of stage 617 may be folded back inwardly over itself to form the outer convolution (e.g., at least 40%, etc.). Stage 617 includes a peripheral wall 619 surrounding outer convolution 694 to withstand pressure and guide expansion of the outer convolution. The peripheral wall includes rollers 615 to traverse the interior surface of housing 690 and enable telescopic movement of stage 617 relative to the interior of housing 690.

Airbag 622 is further constructed with a fold 627 enabling a portion of the airbag to fold back inwardly over itself into an interior space of the airbag, thereby forming an inner recess or convolution 692 extending within the interior of stage 607 (e.g., extends approximately 40% or more of the length of stage 607, etc.). For example, slightly less than one-half of stage 607 of airbag 622 is folded back inwardly over itself to form inner recess or convolution 692, but any portion less than 50% of stage 607 may be folded back inwardly over itself to form the inner convolution (e.g., at least 40%, etc.). Stage 607 includes a peripheral wall 609 surrounding inner convolution 692 to withstand pressure and guide expansion of the inner convolution. The peripheral wall includes rollers 611 to traverse the interior surface of peripheral wall 619 of stage 617 to enable telescopic movement of stage 607 relative to stage 617.

The interior of housing 690 includes dimensions greater than the dimensions of stage 617, while stage 617 includes dimensions greater than the dimensions of stage 607. Outer convolution 694 (or stage 617) receives inner convolution 692 (or stage 607), while the interior of housing 690 receives the nested stages 607, 617 (FIG. 6A). Release unit 600 ejects or releases item 670 in response to expansion of airbag 622. Outer convolution 694 has at least a partially open bottom portion to enable fluid to pass therethrough to expand inner convolution 692. In other words, stages 607, 617 are nested (or form a telescopic arrangement) such that each stage (or convolution) expands simultaneously via rollers 611, 615 with stage 617 disengaging hooks 650, 655 from the item to eject or release the item. Telescopic timing mechanism 610 controls the rate of expansion of each stage 607, 617 to enable the stages (or inner and outer convolutions) to expand simultaneously and reach full expansion at substantially the same time.

Airbag 622 receives fluid from a gas or fluid source 603 and stages 607, 617 simultaneously inflate or expand through the housing open bottom portion and manipulate hooks 650, 655 to release item 670 (FIG. 6B). The gas or fluid source may be any conventional or other source of fluid (e.g., gas, liquid, etc.), and may be a separate component or included within release unit 600. The inner surfaces of housing 690 withstand the pressure and guide expansion of airbag 622 downward, while the inner surfaces of peripheral wall 619 withstand the pressure and guide expansion of stage 617 downward. In addition, the inner surfaces of peripheral wall 609 withstand the pressure and guide expansion of stage 607 downward. Peripheral walls 609, 619 basically direct expansion of corresponding stages 607, 617 downward and away from housing 690 (and a corresponding platform).

The expansion causes stage 617 to move toward item 670 via rollers 615, and outer convolution 694 of stage 617 to unfold over itself and roll along the interior surface of peripheral wall 619. Further, stage 607 moves toward item 670 via rollers 611, and inner convolution 692 of stage 607 unfolds over itself and rolls along the interior surface of peripheral wall 609. The expansion of the stages manipulates hooks 650, 655 to release item 670. Telescopic timing mechanism 610 controls the rate of expansion of each stage to enable the stages (or inner and outer convolutions) to expand simultaneously and reach full expansion at substantially the same time.

Telescopic timing mechanism 610 provides stability and controls the rate of expansion of outer convolution 694 (or stage 617) and inner convolution 692 (or stage 607). The telescopic timing mechanism includes bars 620, 625, 643, 651. The bars are generally rectangular, but may of any shape with any dimensions. Bars 620, 625 are arranged in a crossing or generally 'X' type configuration and are attached to each other proximate the center of the bars by a fastener 640. The fastener is secured within a slot 645 defined in peripheral wall 619 of stage 617.

The proximal end of bar 620 is secured to housing 690 by a fastener 630 disposed within a slot 635 defined in the housing, while the distal end of bar 620 is secured to peripheral wall 609 of stage 607 by a fastener 681. A lever 683 is disposed proximate fastener 681 that manipulates hook 650 in response to rotation of bar 620 relative to fastener 681 during elongation and contraction of telescopic timing mechanism 610. A proximal portion of bar 620 is attached to a proximal end of bar 643 by a fastener 653. The proximal end of bar 625 is secured to housing 690 by a fastener 629, while the distal end of bar 625 is secured to peripheral wall 609 of stage 607 by a fastener 677 disposed within a slot 675 defined in peripheral wall 609. A lever 679 is disposed proximate slot 675 that manipulates hook 655 in response to interaction with fastener 677 during elongation and contraction of telescopic timing mechanism 610. A distal portion of bar 625 is attached to a proximal end of bar 651 by a fastener 657. The distal ends of bars 643, 651 are attached to each other by a fastener 647 disposed within a slot 649 defined in peripheral wall 619 of stage 617. This arrangement basically ties telescopic timing mechanism 610 to stages 607, 617. The slots are generally elliptical, but may be of any shape with any dimensions and disposed at any locations. The fasteners may be implemented by any conventional or other securing mechanisms (e.g., bolts, rivets, etc.).

Bars 620, 625 are rotatable relative to fastener 640, while fasteners 630, 640, 647, 677 may traverse corresponding slots 635, 645, 649, 675 to enable the proximate and distal ends of the bars to move toward and away form each other for expansion and contraction of airbag 622. In other words, telescopic timing mechanism 610 provides a scissor type configuration that enables elongation (and contraction) of the telescopic timing mechanism to control the rate of expansion of airbag 622. By way of example, telescopic timing mechanism 610 enables stage 607 to expand at twice the rate of stage 617. However, the telescopic timing mechanism may be configured to enable the stages to expand at any desired rates.

Release unit 600 further includes springs 660, 665 disposed toward opposing sides of housing 690. Springs 660, 665 are each attached to a housing proximal portion, and a distal end of stage 607. Springs 660, 665 elongate in response to expansion of airbag 622, and return the airbag to a contracted state after release of item 670 (e.g., with stage 607 disposed within stage 617 and the nested stages disposed within housing 690).

The slots and fasteners of telescopic timing mechanism 610 that are defined in or contact housing 690 and peripheral walls 609, 619 of stages 607, 617 are preferably blind features, or inwardly facing (e.g., these features exist on the inside walls of these components and do not penetrate the components in order to maintain a hermetic seal inside and prevent escape of gas, thereby enabling the expansion, etc.). However, hooks 650, 655 and the action that rotates them preferably pass through peripheral wall 609 of stage 607 to hold and release the attached item. The hooks may be built into external recessed pockets of stage 607 from the bottom, and hermetically separated from the interior, with seals on any shafts transmitting motion to them.

Release unit 600 may reside in an initial state with airbag 622 contracted and stage 607 disposed within stage 617 and the nested stages disposed in housing 690 (FIG. 6A). Further, telescopic timing mechanism 610 resides in a contracted state with the proximal and distal ends of bars 620, 625 situated at maximal distances from each other. Item 670 may be secured by hooks 650, 655 engaging projections

680, 685 of the item. Airbag 622 receives fluid from gas source 603 and stages 607, 617 simultaneously inflate or expand through the open bottom portion of housing 690 and manipulate hooks 650, 655 to release item 670 (FIG. 6B).

The expansion causes stage 617 to move toward item 670 via rollers 615, and outer convolution 694 of stage 617 to unfold over itself and roll along the interior surface of peripheral wall 619. Further, stage 607 moves toward item 670 via rollers 611, and inner convolution 692 of stage 607 unfolds over itself and rolls along the interior surface of peripheral wall 609. The expansion of the stages manipulates hooks 650, 655 to release item 670.

Telescopic timing mechanism 610 controls the rate of expansion of each stage to enable the stages to expand simultaneously and reach full expansion at substantially the same time. In particular, expansion of airbag 622 causes elongation of telescopic timing mechanism 610. The forces (or resistance) applied by the telescopic timing mechanism during elongation controls the rate of expansion of the airbag. Specifically, as airbag 622 expands through the open bottom portion of housing 690, fastener 630 traverses slot 635 in a direction toward the proximal end of bar 625, thereby causing the proximal end of bar 620 to move toward the proximal end of bar 625. Similarly, fastener 677 traverses slot 675 in a direction toward the distal end of bar 620, thereby causing the distal end of bar 625 to move toward the distal end of bar 620. The movement of the proximal end of bar 620 and the distal end of bar 625 causes fastener 640 to traverse slot 645 in a direction toward spring 660 and fastener 647 to traverse slot 649 in a direction toward fastener 640. These movements elongate timing mechanism 610 (FIG. 6B), where the elongation provides a restraining force (or resistance) to the airbag stages to control their rate of expansion.

As telescopic timing mechanism 610 expands, the proximal end of bar 620 moves toward the proximal end of bar 625 as described above. This movement causes the distal end of bar 620 to rotate about fastener 681 and manipulate (or actuate) lever 683 to disengage hook 650 from projection 680 of item 670. Basically, lever 683 causes hook 650 to move or pivot toward hook 655, thereby disengaging projection 680. Further, the distal end of bar 625 moves toward the distal end of bar 620. This movement manipulates (or actuates) lever 679 to disengage hook 655 from projection 685 of item 670. Lever 679 basically causes hook 655 to move or pivot away from hook 650, thereby disengaging projection 685. Thus, expansion of airbag 622 distances item 670 from housing 690 (and a corresponding platform) and elongates telescopic timing mechanism 610 to release item 670. Once the item is released (and airbag 622 contracts), springs 660, 665 return the airbag to the initial state (FIG. 6A) (e.g., within housing 690 with stage 607 disposed within stage 617).

In the embodiments with a telescoping inflatable device described above, the inflatable object may include a single airbag with plural convolutions that may be used with the tubular member and the release unit. However, an inflatable object including a plurality of airbags (or other objects) may be used for the telescoping inflatable device. In this case, distinct airbags (or other objects) are sealed where they are fastened to the structure and used to form corresponding convolutions.

Figure 7A:
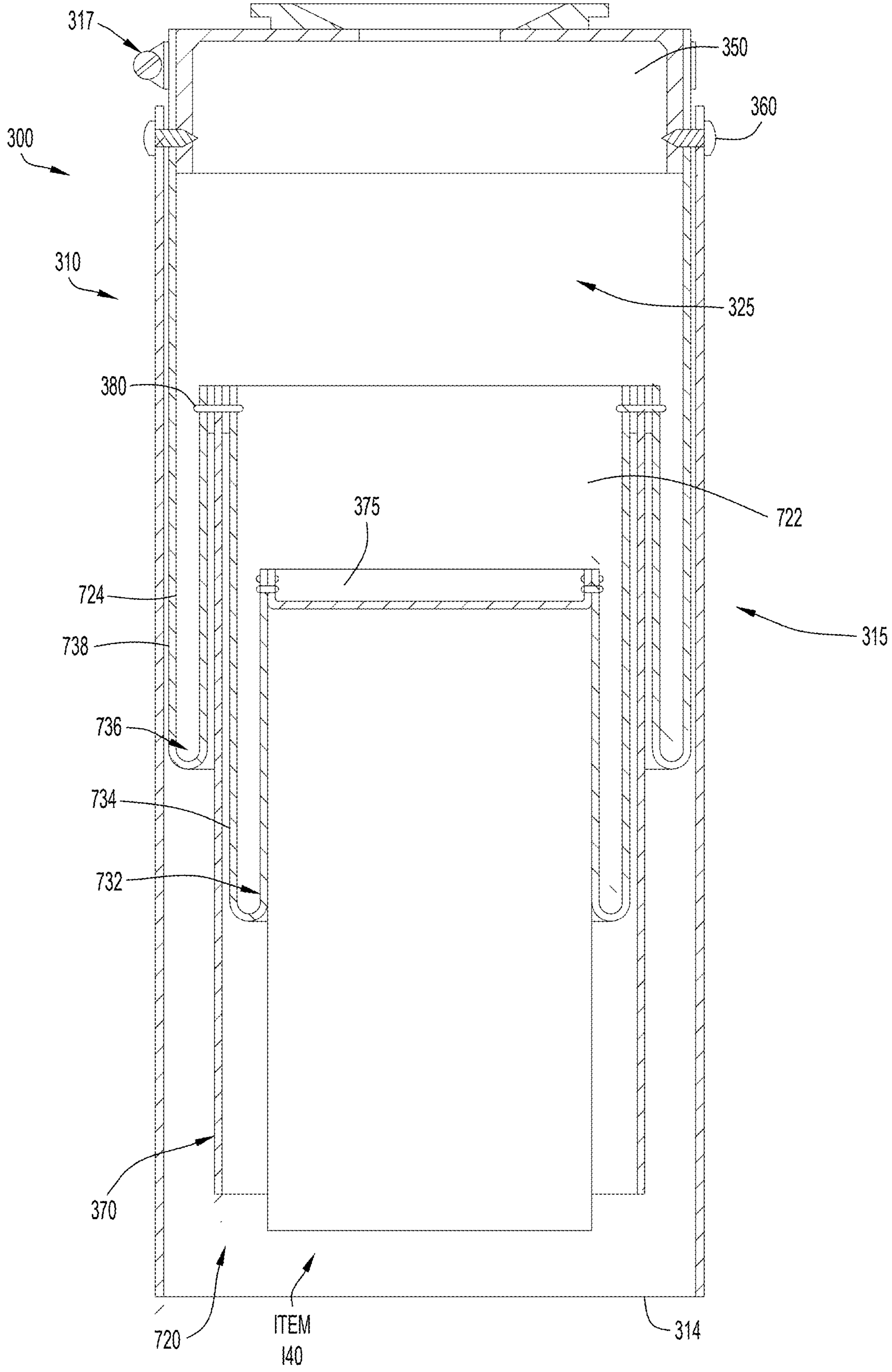
FIG. 7A is a view in elevation and partial section of a telescopic inflatable device with distinct airbags for ejecting an item according to an embodiment of the present disclosure.

By way of example, FIG. 7A illustrates a telescopic inflatable device with distinct airbags for convolutions. Initially, ejection mechanism 300 is substantially similar to the ejection mechanism described above (FIGS. 3A-3B), and employs an inflatable device 720. The inflatable device is substantially similar to inflatable device 320 described above (FIG. 3B), except that inflatable device 720 includes plural distinct airbags 722, 724 for convolutions. The airbags may be constructed of any suitable materials, such as those used for conventional airbags for automobiles or other vehicles. The airbags are generally cylindrical, but may be of any shape. Inflatable device 720 includes telescoping stages 315, 325 as described above with stage 315 disposed distally of stage 325. Stage 315 includes airbag 722, while stage 325 includes airbag 724.

Airbag 724 includes a proximal end secured to fluid fitting cap 350 via a hose clamp 317 in substantially the same manner described above. The airbag proximal end is secured between tubular member 310 and fluid fitting cap 350 via fasteners 360 (e.g., screws, etc.) in substantially the same manner described above. Fluid fitting cap 350 engages a gas source to enable gas or other fluid to enter and expand airbag 724 in substantially the same manner described above. Airbag 724 is constructed with a fold 736 enabling a portion of the airbag to fold back inwardly over itself into an interior space of the airbag, thereby forming an outer recess or convolution 738 within the interior of stage 325 in substantially the same manner described above.

Airbag 722 of stage 315 is constructed with a fold 732 enabling a portion of the airbag to fold back inwardly over itself into an interior space of the airbag, thereby forming an inner recess or convolution 734 extending within the interior of stage 315 in substantially the same manner described above. A distal end of airbag 722 includes cap or plug 375. The cap may be of any suitable size or shape and constructed of any desired materials. The cap may be sewn to the airbag distal end, preferably with a seam on the external side and double row stitching in substantially the same manner described above.

Stage 315 further includes stage tubular member 370 containing stage 315 and inner convolution 734. The stage tubular member extends from the bottom of outer convolution 738 toward aperture 314 of tubular member 310, and has a length typically similar to the length of expanded stage 315. The bottom portions of outer convolution 738 of airbag 724, airbag 722, and stage tubular member 370 are secured together by fasteners 380 (e.g., rivets, etc.) with the stage tubular member disposed between the outer convolution and airbag 722. This seals airbags 722, 724 to enable gas to pass through stage 325 and expand stage 315.

Outer convolution 738 of stage 325 has dimensions greater than the dimensions of inner convolution 734 of stage 315. Outer convolution 738 of stage 325 receives inner convolution 734 of stage 315 to eject item 140 from tubular member 310 in response to expansion of airbags 722, 724. Outer convolution 738 has at least a partially open bottom portion to enable fluid to pass therethrough to inflate or expand inner convolution 734. In other words, stages 315, 325 are nested (or form a telescopic arrangement) such that each stage expands simultaneously with stage 315 engaging and applying force to move item 140 toward aperture 314 to eject the item from tubular member 310 in substantially the same manner described above. Timing module 340 (FIGS. 4A-4C) controls the rate of expansion of each stage 315, 325 to enable the stages to expand simultaneously and reach full expansion at substantially the same time in substantially the same manner described above.

Figure 7B:
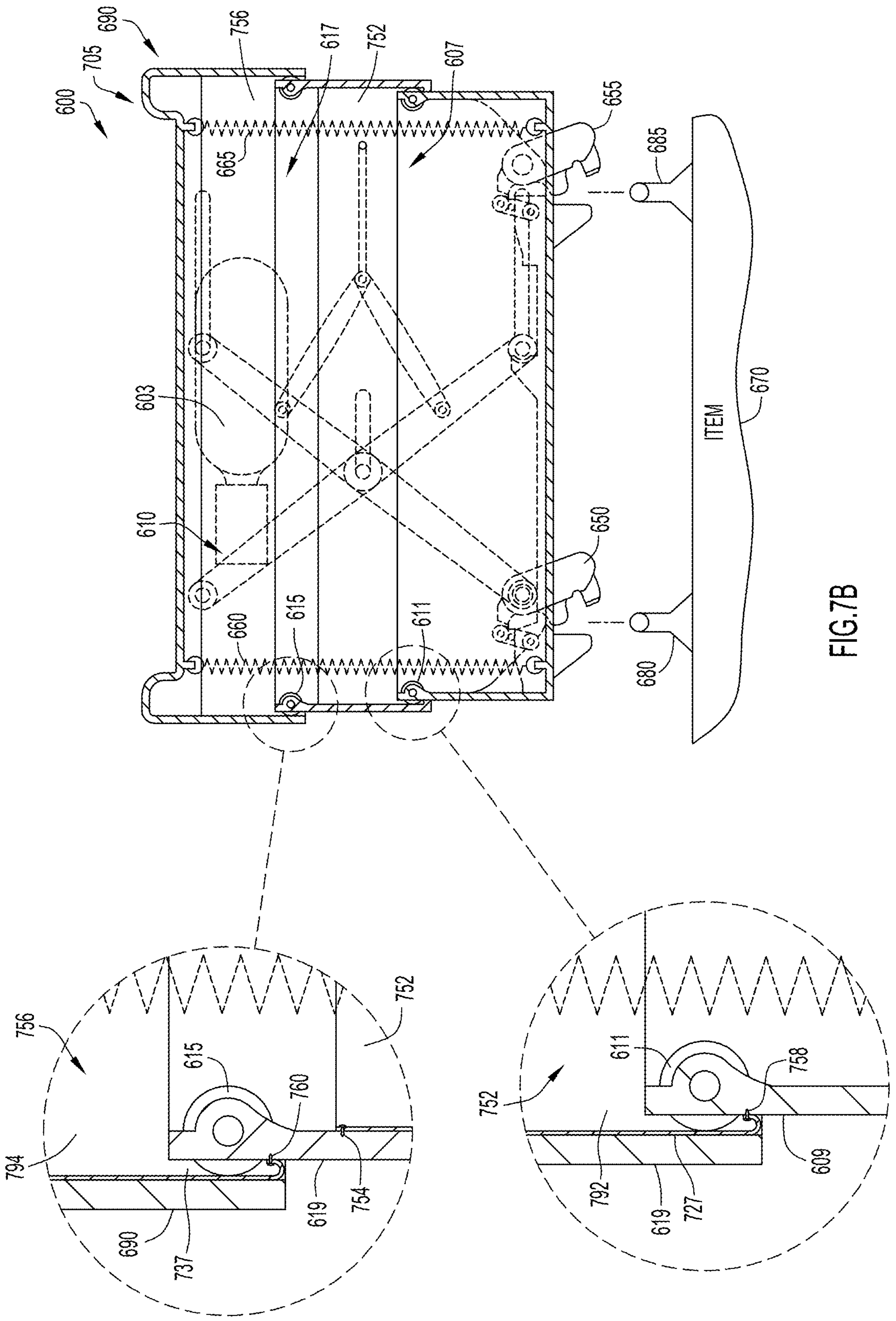
FIG. 7B is a view in elevation and partial section of an ejection mechanism in the form of a release unit with a telescopic inflatable device having distinct airbags according to an embodiment of the present disclosure.

By way of further example, FIG. 7B illustrates a telescopic inflatable device with distinct airbags for convolutions for use with release unit 600. Initially, release unit 600 is substantially similar to the release unit described above (FIGS. 6A-6B), and employs an inflatable device 705. The inflatable device is substantially similar to inflatable device 605 described above (FIG. 6B), except that inflatable device 705 includes plural distinct airbags 752, 756 for convolutions. The airbags may be constructed of any suitable materials, such as those used for conventional airbags for automobiles or other vehicles. The airbags are generally cylindrical, but may be of any shape. Inflatable device 705 includes telescoping stages 607, 617 as described above with stage 607 disposed distally of stage 617. Stage 607 includes airbag 752, while stage 617 includes airbag 756. Item 670 may be secured by a securing mechanism, where the item includes projections or lugs 680, 685 at opposing ends of an item top surface that engage corresponding hooks 650, 655 of the release unit in substantially the same manner described above.

Housing or other retaining structure 690 includes inflatable device 705 and telescoping timing mechanism 610 disposed therein. The telescopic timing mechanism is substantially similar to the telescoping timing mechanism described above and controls expansion of the inflatable device. Housing 690 includes an open bottom that enables inflatable device 705 to expand, thereby distancing item 670 from the release unit (and corresponding platform) and disengaging hooks 650, 655 from the item to release the item in substantially the same manner described above.

A proximal end of airbag 756 is secured to a top or upper portion of the housing interior surface. Airbag 756 is constructed with a fold 737 enabling a portion of the airbag to fold back inwardly over itself into an interior space of the airbag, thereby forming an outer recess or convolution 794 extending within the interior of stage 617 (e.g., extends approximately 40% or more of the length of stage 617, etc.). Stage 617 includes a peripheral wall 619 surrounding outer convolution 794 to withstand pressure and guide expansion of the outer convolution. The peripheral wall engages rollers 615 to traverse the interior surface of housing 690 and enable telescopic movement of stage 617 relative to the interior of housing 690. A lower portion of airbag 756 is secured to rollers 615 via fasteners 760 (e.g., screws, etc.) to seal airbag 756 for expansion.

Airbag 752 of stage 607 is constructed with a fold 727 enabling a portion of the airbag to fold back inwardly over itself into an interior space of the airbag, thereby forming an inner recess or convolution 792 extending within the interior of stage 607 (e.g., extends approximately 40% or more of the length of stage 607, etc.). Stage 607 includes a peripheral wall 609 surrounding inner convolution 792 to withstand pressure and guide expansion of the inner convolution. The peripheral wall engages rollers 611 to traverse the interior surface of peripheral wall 619 of stage 617 to enable telescopic movement of stage 607 relative to stage 617. An upper portion of airbag 752 is secured to rollers 615 via fasteners 754 (e.g., screws, etc.), while a lower portion of airbag 752 is secured to rollers 611 via fasteners 758 (e.g., screws, etc.) to seal airbag 752 for expansion.

The interior of housing 690 includes dimensions greater than the dimensions of stage 617, while stage 617 includes dimensions greater than the dimensions of stage 607. Outer convolution 794 (or stage 617) receives inner convolution 792 (or stage 607), while the interior of housing 690 receives the nested stages 607, 617 in substantially the same manner described above. Release unit 600 ejects or releases item 670 in response to expansion of airbags 752, 756 via fluid from gas or other fluid source 603. Outer convolution 794 has at least a partially open bottom portion to enable fluid to pass therethrough to expand inner convolution 792. In other words, stages 607, 617 are nested (or form a telescopic arrangement) such that each stage (or convolution) expands simultaneously via rollers 611, 615 with stage 617 disengaging hooks 650, 655 from the item to eject or release the item in substantially the same manner described above. Telescopic timing mechanism 610 controls the rate of expansion of each stage 607, 617 to enable the stages (or inner and outer convolutions) to expand simultaneously and reach full expansion at substantially the same time in substantially the same manner described above. Springs 660, 665 elongate in response to expansion of airbags 752, 756, and return the airbags to a contracted state after release of item 670 (e.g., with stage 607 disposed within stage 617 and the nested stages disposed within housing 690).

Figure 8:
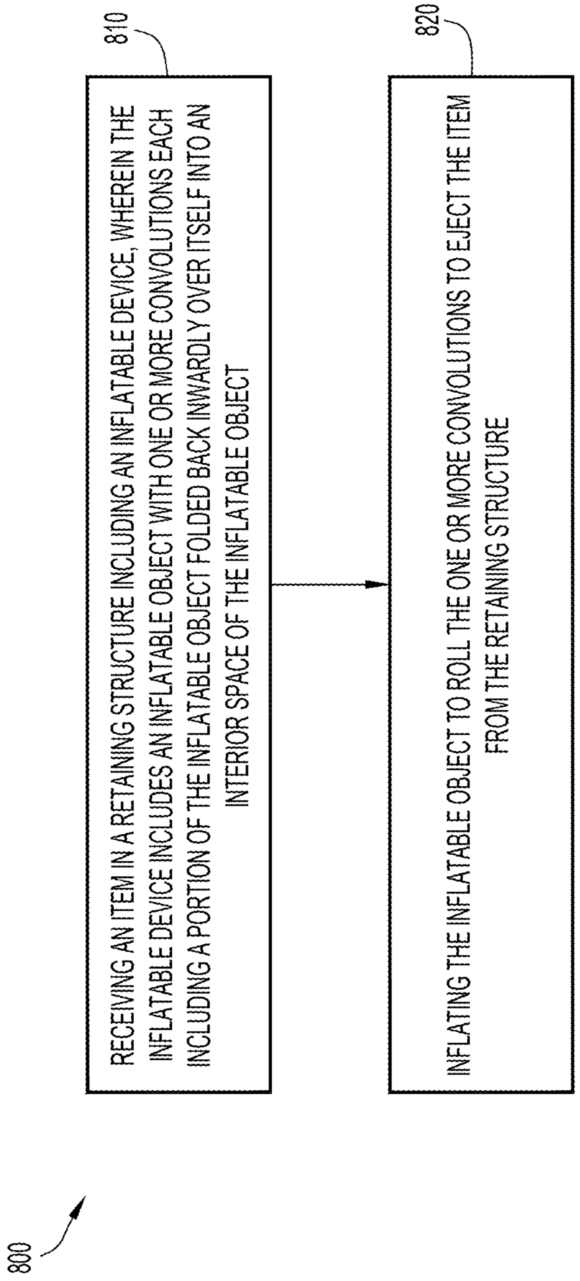
FIG. 8 is a flowchart of an example method of ejecting an item using an inflatable device according to an embodiment of the present disclosure.

FIG. 8 illustrates a method 800 performed by an embodiment to eject an item. In operation 810, an item is received in a retaining structure including an inflatable device. The inflatable device includes an inflatable object with one or more convolutions each including a portion of the inflatable object folded back inwardly over itself into an interior space of the inflatable object. In operation 820, the inflatable object is inflated to roll the one or more convolutions to eject the item from the retaining structure.

In summary, in some aspects, the techniques described herein relate to an ejection mechanism comprising: a retaining structure to receive an item; and an inflatable device within the retaining structure and including an inflatable object with one or more convolutions that roll in response to inflation of the inflatable object to eject the item from the retaining structure, wherein each convolution includes a portion of the inflatable object folded back inwardly over itself into an interior space of the inflatable object.

In some aspects, the techniques described herein relate to the inflatable object including an airbag.

In some aspects, the techniques described herein relate to the retaining structure including a tubular member.

In some aspects, the techniques described herein relate to the tubular member including one or more slots, and the item including one or more projections disposed within the one or more slots.

In some aspects, the techniques described herein relate to the tubular member including an opening, and the item is coupled to a connector disposed through the opening.

In some aspects, the techniques described herein relate to the inflatable object including a plurality of telescopic convolutions.

In some aspects, the techniques described herein relate to the ejection mechanism further comprising a timing mechanism applying resistance to the telescopic convolutions to control rates of expansion of the telescopic convolutions, wherein the timing mechanism controls at least two convolutions to expand at different rates.

In some aspects, the techniques described herein relate to the timing mechanism including springs with different resistance to control the rates of expansion of the telescopic convolutions.

In some aspects, the techniques described herein relate to the item being releasably secured to the retaining structure by a securing mechanism actuated by expansion of the telescopic convolutions to release the item.

In some aspects, the techniques described herein relate to the timing mechanism including a plurality of bars arranged in a scissor configuration, wherein elongation of the scissor configuration applies forces to control the rates of expansion of the telescopic convolutions.

In some aspects, the techniques described herein relate to a method of ejecting an item comprising: receiving an item in a retaining structure including an inflatable device, wherein the inflatable device includes an inflatable object with one or more convolutions each including a portion of the inflatable object folded back inwardly over itself into an interior space of the inflatable object; and inflating the inflatable object to roll the one or more convolutions to eject the item from the retaining structure.

In some aspects, the techniques described herein relate to the method of ejecting an item, wherein the inflatable object includes an airbag.

In some aspects, the techniques described herein relate to the method of ejecting an item, wherein the retaining structure includes a tubular member.

In some aspects, the techniques described herein relate to the method of ejecting an item, wherein the tubular member includes one or more slots, and the item includes one or more projections disposed within the one or more slots.

In some aspects, the techniques described herein relate to the method of ejecting an item, wherein the tubular member includes an opening, and the item is coupled to a connector disposed through the opening.

In some aspects, the techniques described herein relate to the method of ejecting an item, wherein the inflatable object includes a plurality of telescopic convolutions.

In some aspects, the techniques described herein relate to the method of ejecting an item, further comprising applying resistance to the telescopic convolutions to control rates of expansion of the telescopic convolutions, wherein at least two convolutions expand at different rates.

In some aspects, the techniques described herein relate to the method of ejecting an item, wherein applying resistance comprises applying the resistance by springs having different resistance to control the rates of expansion of the telescopic convolutions.

In some aspects, the techniques described herein relate to the method of ejecting an item, wherein the item is releasably secured to the retaining structure by a securing mechanism and the method further comprises actuating the securing mechanism by expansion of the telescopic convolutions to release the item.

In some aspects, the techniques described herein relate to the method of ejecting an item, wherein applying resistance comprises applying the resistance by a plurality of bars arranged in a scissor configuration, wherein elongation of the scissor configuration applies forces to control the rates of expansion of the telescopic convolutions.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. An ejection mechanism comprising:
- a retaining structure to receive an item;
- an inflatable device within the retaining structure and including an inflatable object with a plurality of convolutions that roll in response to inflation of the inflatable object to eject the item from the retaining structure, wherein each convolution includes a portion of the inflatable object folded back inwardly over itself into an interior space of the inflatable object; and
- a timing mechanism applying resistance to the plurality of convolutions to control rates of expansion of the plurality of convolutions.

2. The ejection mechanism of claim 1, wherein the inflatable object includes an airbag.

3. The ejection mechanism of claim 1, wherein the retaining structure includes a tubular member.

4. The ejection mechanism of claim 3, wherein the tubular member includes one or more slots, and the item includes one or more projections disposed within the one or more slots.

5. The ejection mechanism of claim 3, wherein the tubular member includes an opening, and the item is coupled to a connector disposed through the opening.

6. The ejection mechanism of claim 1, wherein the plurality of convolutions includes telescopic convolutions.

7. The ejection mechanism of claim 6,
- wherein the timing mechanism controls at least two convolutions to expand at different rates.

8. The ejection mechanism of claim 7, wherein the timing mechanism includes springs with different resistance to control rates of expansion of the telescopic convolutions.

9. The ejection mechanism of claim 7, wherein the item is releasably secured to the retaining structure by a securing mechanism actuated by expansion of the telescopic convolutions to release the item.

10. The ejection mechanism of claim 9, wherein the timing mechanism includes a plurality of bars arranged in a scissor configuration, wherein elongation of the scissor configuration applies forces to control rates of expansion of the telescopic convolutions.

11. A method of ejecting an item comprising:
- receiving an item in a retaining structure including an inflatable device, wherein the inflatable device includes an inflatable object with a plurality of convolutions each including a portion of the inflatable object folded back inwardly over itself into an interior space of the inflatable object;
- inflating the inflatable object to roll the plurality of convolutions to eject the item from the retaining structure; and
- applying resistance to the plurality of convolutions to control rates of expansion of the plurality of convolutions.

12. The method of claim 11, wherein the inflatable object includes an airbag.

13. The method of claim 11, wherein the retaining structure includes a tubular member.

14. The method of claim 13, wherein the tubular member includes one or more slots, and the item includes one or more projections disposed within the one or more slots.

15. The method of claim 13, wherein the tubular member includes an opening, and the item is coupled to a connector disposed through the opening.

16. The method of claim 11, wherein the plurality of convolutions includes telescopic convolutions.

17. The method of claim 16,
- wherein at least two convolutions expand at different rates.

18. The method of claim 17, wherein applying resistance comprises:
- applying the resistance by springs having different resistance to control rates of expansion of the telescopic convolutions.

19. The method of claim 17, wherein the item is releasably secured to the retaining structure by a securing mechanism and the method further comprises:
- actuating the securing mechanism by expansion of the telescopic convolutions to release the item.

20. The method of claim 19, wherein applying resistance comprises:

applying the resistance by a plurality of bars arranged in a scissor configuration, wherein elongation of the scissor configuration applies forces to control rates of expansion of the telescopic convolutions.

* * * * *